March 28, 1944.  W. ANGST  2,345,444
POWER METER
Filed Nov. 9, 1940  2 Sheets-Sheet 1
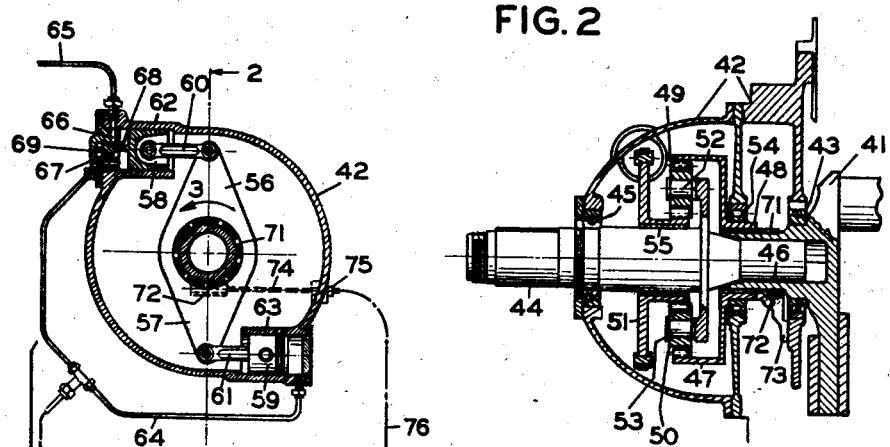
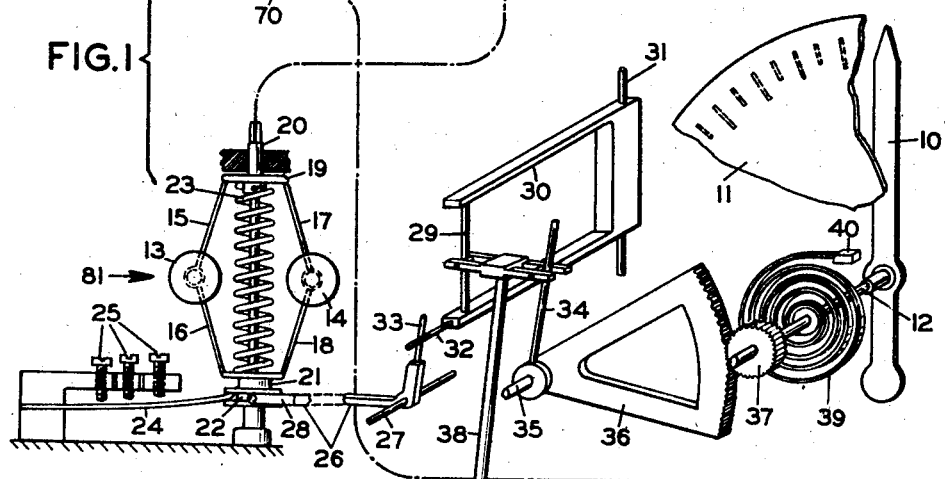
INVENTOR
WALTER ANGST
BY Gunter Rathke
his ATTORNEY

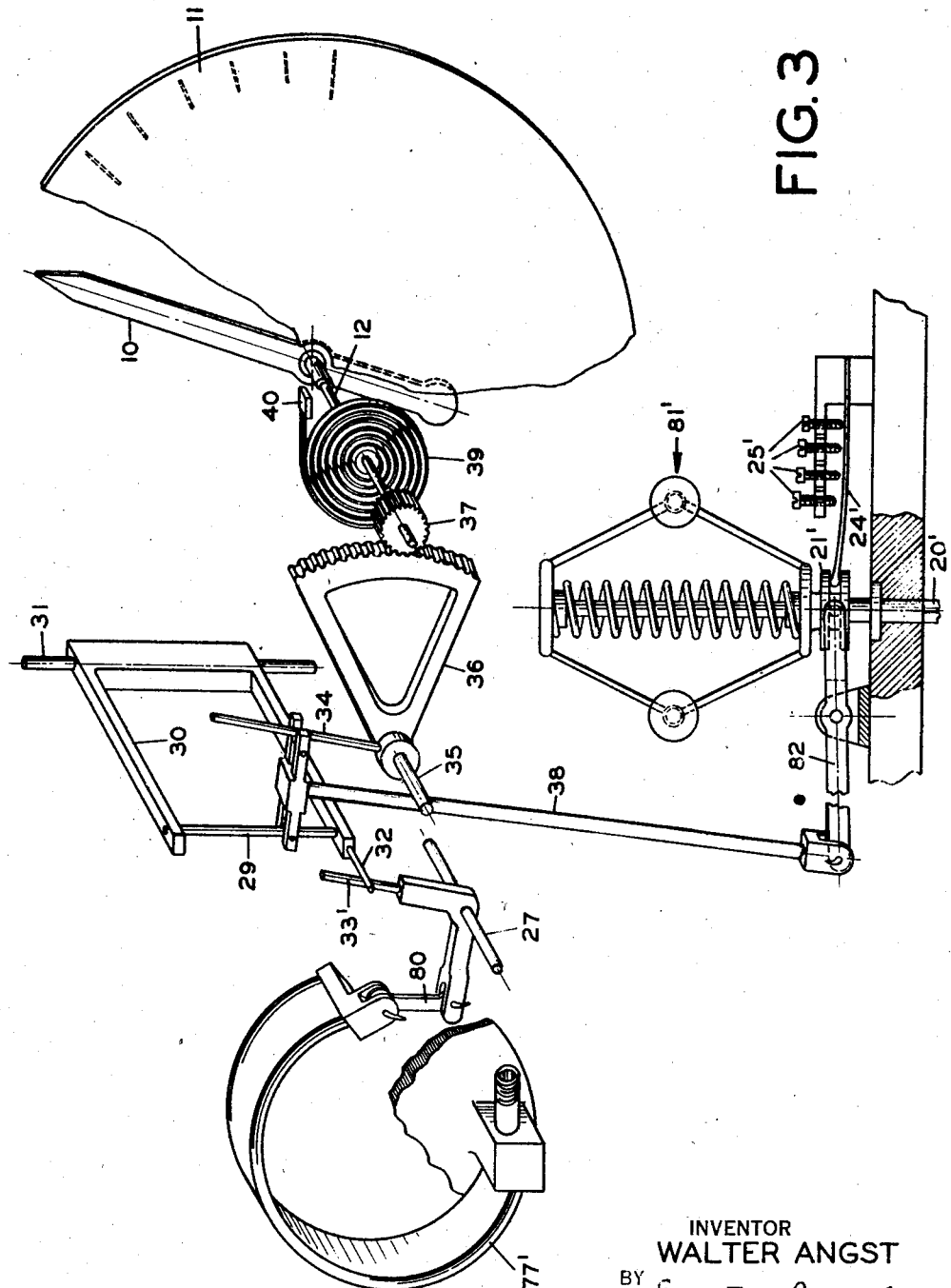

Patented Mar. 28, 1944

2,345,444

UNITED STATES PATENT OFFICE 2,345,444

POWER METER

Walter Angst, Manhasset, N. Y., assignor to Square D Company, Detroit, Mich., a corporation of Michigan Application November 9, 1940, Serial No. 364,953

3 Claims. (Cl. 265—25)

This invention relates to power responsive devices for engines, more particularly internal combustion engines such as are used on aircraft.

It is an object of this invention to provide an improved device which will respond to, or indicate, the actual power output of the engine irrespective of changes in conditions or factors under which the engine may operate. Such factors may be quantity of fuel, temperature and pressure of the combustion air, or moisture and oxygen content of the same.

The invention thus aims at providing a reliable device for indicating or controlling the true power output of an engine. This object is of particular importance in the operation of long range aircraft where fuel economy and maintenance of a predetermined power output at which the engine operates most efficiently is essential.

It is a further object of this invention to provide a power responsive device utilizing two impulses derivable from the engine, a first impulse proportional to the speed of the engine, the second impulse proportional to the engine torque. Both impulses are utilized for jointly operating a movable member which may either be a pointer or, equally, a movable member of a control relay.

More particularly, this invention aims at providing a power responsive instrument having an actuating mechanism operated in response to one of said impulses and including means for varying its ratio of transmission, said means being operated in response to the other impulse. In this manner a combination of the two impulses and a joint operation of the movable member or pointer is accomplished with a minimum of loss and, accordingly, a maximum of accuracy since the forces required for moving said member or pointer are extremely small.

It is a further object of this invention to provide a power responsive instrument adapted for use in connection with an engine having means operable in response of the engine torque.

More particularly, this invention aims at providing a power meter suited for use with aircraft engines having pressure fluid operated means for measuring the torque of the engine, more specifically for engines having a planetary gear for driving the propeller including rotating driving and driven gears and a relatively stationary sun gear, the reaction torque on which is determinable by pressure fluid operated means.

The invention thus aims at providing a power responsive device utilizing as one of its operating impulses a pressure impulse produced by a pressure fluid operated device of the character mentioned.

The invention further aims at providing a power responsive device, simple of construction, easy to manufacture and reliable in operation requiring no further compensating means for changes in operating conditions of the engine such as the aforementioned changes in atmospheric temperature, pressure, humidity, oxygen content and the like.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of this invention being defined in the appended claims.

Referring to the drawings:

Fig. 1 is an illustration, partly in perspective view, of an embodiment of this invention;

Fig. 2 is a side view of an element shown in Fig. 1, a section being taken on line 2—2; and Fig. 3 illustrates a modification of the device shown in Fig. 1.

A purpose of the invention is to actuate a movable member such as the actuating arm of a relay or an indicator in response to changes in the power output of an engine.

In Fig. 1 the movable member is shown, by way of illustration, in the form of a pointer 10 movable relatively to a graduated dial 11 by means of a pointer shaft 12.

For the purpose of this description, the engine may be assumed to be an internal combustion engine of the type used on aircraft.

Two impulses are derived from the engine for actuating the aforementioned movable member or pointer in response to the engine power.

In the illustrated embodiment a first impulse proportional to the speed of the engine is derived by means of a speed responsive device shown in the form of a weighted rotatable element driven at a rate proportional to the rate of speed of the engine.

Two flyweights 13 and 14 are shown carried by toggle levers 15, 16, 17 and 18. The toggle levers 15 and 17 are pivotally mounted to a fixed collar 19 secured to a tachometer shaft 20. The toggle levers 16 and 18 are pivotally connected to a movable collar 21 provided with a circumferential groove 22 and slideable in axial direction on the shaft 20. The centrifugal movement of the flyweights is counteracted by suitable means such as a helical spring 23.

In order to obtain a displacement of the movable collar 21, which is a linear function of the rotary speed of the shaft 20, a further constraining means may be provided, shown in the illustrated embodiment as being a flat spring 24, engaging with its free end the circumferential groove 22 in the movable collar. The movement of the spring is limited by adjustable stops 25 permitting the movement-versus-speed-characteristic of the speed responsive means to be varied within wide limits.

The movement of the collar 21 thus represents an impulse proportional to the speed of an engine. This impulse may be transmitted to a motion amplifying mechanism for actuating the pointer by means of bell crank lever 26 pivoted at 27 and engaging with one forked end 28 the groove 22 of the collar 21.

In the illustrated embodiment the motion amplifying mechanism includes a device for varying its ratio of transmission about a pivotal axis parallel to its own axis. The ratio bearing device of the illustrated embodiment includes a rod 29 mounted in a frame 30 for movement about a pivotal axis 31 parallel to the axis of the rod. The rod is connected for movement by the speed responsive means by means of a pin 32 on the frame engaged by the free end 33 of the bell crank lever.

A lever 34 extends substantially parallel to the rod 29, the lever being movable about a pivotal axis 35 normal to the lever axis. The lever 34 actuates a toothed segment 36 rigidly connected thereto, the segment meshing with the pinion 37 on the pointer shaft 10.

A ratio slider 38 is provided for operatively connecting the rod 29 and the lever 34 at a variable distance from the pivotal axis 35 of the lever. Means may be provided for maintaining the elements of the motion amplifying mechanism in engagement, a hair spring 39 being shown for this purpose. This hair spring is connected with its inner end to the pointer shaft and with its outer end to a fixed point 40 for exerting a slight bias on the mechanism.

The operation of the device so far described is as follows:

An increase in engine speed transmitted to the speed responsive device will cause an upward movement of the movable collar 21 relatively to the shaft 20. This movement causes a lateral displacement of the rod 29 through the bell crank lever 26. The displacement of the rod 29 causes a clockwise rotation of the toothed sector 36 about its axis and a counter-clockwise movement of the pointer relatively to the dial.

A second impulse proportional to the engine torque is derived from the engine for increasing and decreasing the action of the speed impulse on the movable member, in the illustrated embodiment, the indicating means.

The second impulse may be utilized for increasing and decreasing the ratio of transmission of the actuating mechanism.

The device for deriving a torque impulse may be of any suitable form and is shown in the illustrated embodiment as being of the pressure fluid type responsive to the reaction exerted by the engine on its support.

In Figs. 1 and 2 the end of the engine crankshaft 41 is shown as mounted in motor casing or support 42 by means of a bearing 43. The engine crankshaft drives a propeller shaft 44 mounted in bearings 45 and 46 through a reduction gear.

The reduction gear comprises a driving gear 47 keyed to the crankshaft at 48, a set of planetary gears, two of which are shown at 49 and 50, and a relatively stationary sun gear 51. The planetary gears 49 and 50 are mounted on arms 52 and 53 of the propeller shaft 44 to drive the same. The driving gear 47 may be supported in the engine casing 42 by means of a further bearing 54.

The relatively stationary sun gear 51 may be mounted on the propeller shaft by means of a bearing 55 and provided with two arms or lugs 56 and 57 for bracing the sun gear against rotation relatively to the engine casing.

In operation the driving gear 47 causes the planetary gears to revolve about the sun gear, thereby exerting a reaction torque on the sun gear which is proportional to the engine torque. From this reaction torque a pressure impulse may be derived by any suitable means, one convenient form being shown in Fig. 1.

The pressure fluid operated device of the illustrated embodiment comprises two pistons 58 and 59 connected to the arms 56 and 57 by means of piston rods 60 and 61. The pistons are movable in cylinders 62 and 63 mounted on, or forming part of, the housing 42. The spaces in the cylinders above the pistons are connected by a duct 64.

Pressure fluid from a suitable source (not shown) is supplied to the device through a supply duct 65 terminating at an intake port 66. The intake port is controlled in response to movements of the pistons relatively to the cylinders. In the illustrated embodiment, a sleeve valve is shown comprising a valve member 67 connected to, or forming part of, the piston 58. The sleeve valve has a control edge 68 cooperating with the intake port 66. The space above the control valve may be vented through a suitable vent hole 69.

The pressure fluid operated torque device operates as follows:

Reaction on the sun gear in the direction of the arrow 3 in Fig. 1 causes the piston 58 to move into the cylinder, thereby opening the intake port 66 to admit pressure fluid into the cylinder. The entering pressure fluid forces the piston in the opposite direction until the supply of pressure fluid is shut off. The pressure existing within the cylinder 62 is communicated to the cylinder 63 through the duct 64 and is proportional to the reaction on the sun gear and, accordingly, the torque of the engine.

The pressure impulse is transmitted to a pressure responsive device of suitable form through a duct 70 for modifying the action of the speed impulse on the movable member or indicator of the power responsive device.

A rotary motion proportional to the speed of the engine may also be derived at the device of Fig. 2, there being shown a helical gear train for driving a flexible shaft. A first helical gear 71 is cut into or mounted on the crankshaft meshing with a second gear 72 mounted in a bracket 73 on a shaft 74. The shaft 74 terminates at 75 in a suitable shaft coupling to which a flexible shaft 76 may be connected for actuating the speed responsive means.

Returning now to the second or torque impulse, there is shown in the illustrated embodiment a Bourdon tube 77 connected to the pressure duct 70 and preferably provided with adjustable stops 78 for modifying its movement in response to changes in pressure. The movable end of the Bourdon tube has linked thereto at 79 the ratio slider 38.

An expansion of the Bourdon tube in the direction of the arrow 4 in response to an increase in fluid pressure representing an increase in engine torque will cause the ratio slider to move downwardly, thereby increasing the ratio of transmission of the actuating mechanism.

Since a displacement of the ratio slider at a short distance from the axis 35 will cause a considerably greater change in the ratio of transmission than an equal displacement at a greater distance from the axis, the movement of the Bourdon tube may be correspondingly restrained at high pressures by means of the adjusting stops 78.

The operation of the power meter shown in Figs. 1 and 2 is as follows:

The pointer 10 is moved in response to the engine speed in a manner hereinbefore described, the pointer deflection being the greater the greater the engine speed. This pointer movement is multiplied in response to the engine torque as follows:

An increase in reaction on the sun gear results in a corresponding increase in pressure in the duct 70 and an expansion of the Bourdon tube 77. The movement of the Bourdon tube causes a downward movement of the ratio slider 38 increasing the ratio of transmission of the motion amplifying mechanism. The pointer is thus jointly operated by the torque and speed responsive means causing a total deflection of the pointer which becomes a measure of the engine power. The dial 11 may, accordingly, be graduated in horse power units.

Since the combination of the impulses takes place in the motion amplifying mechanism where the forces are small, the accuracy of indication of the device is correspondingly high since losses such as bearing friction are extremely small.

Obviously the indication is at all times a correct measure of the engine power and is not affected by such operating conditions of the engine as quality of fuel, moisture and oxygen content of the combustion air, changes in pressure, timing of ignition, etc.

A modified form of the power responsive device of Fig. 1 is shown in Fig. 3 in which identical reference numerals are used for denoting identical parts.

In Fig. 3 the movable member or pointer 10 is moved in response to a torque impulse acting as pressure on the Bourdon tube 77'. The Bourdon tube is connected to the bell crank lever 33' by means of a link 80. It will be noted that no restraining means are provided for the Bourdon tube which actuates the mechanism in proportion to the pressure acting on the tube.

A speed responsive means 81' is connected to the ratio slider 38 by means of a double armed lever 82. The speed responsive device is constrained by a flexible spring 24' provided with adjustable stops 25' in a similar manner as described in connection with Fig. 1.

In the embodiment of Fig. 3, however, the restraining means 24', 25' may be used for two purposes. The first is to restrain the displacement of the movable collar 21' to make its movement substantially linearly proportional to the engine speed. The second purpose is to provide for substantially linear change in the ratio of amplification of the ratio bearing device in response to changes in engine speed.

In other respects the operation of the device illustrated in Fig. 3 corresponds to that of the device shown in Fig. 1. An increase in pressure acting on the Bourdon tube 77' will cause a clockwise movement of the bell crank lever 33' resulting in a counterclockwise rotation of the pointer 10. An increase in speed will cause an upward movement of the sleeve 21' of the speed responsive device 81' resulting in a downward movement of the ratio slider 38 and an increase in the ratio of amplification of the mechanism.

Obviously, the present invention is not limited to the particular embodiments herein shown and described. Other forms of devices for deriving impulses proportional to engine speed and torque may be used. Moreover, it is not indispensable that all the features of this invention be used conjointly since they may advantageously be employed in various combinations and sub-combinations.

What is claimed is:

1. A power meter for engines having means for creating a fluid pressure proportional to the engine torque as exerted by the drive shaft of the engine, said meter comprising, in combination, speed responsive means of the centrifugal force type responsive to the speed of the engine, said means including a movable element adapted to be displaced in response to the rotary speed of the engine; means for constraining said element for substantially linear response to the rotary speed of the engine; indicating means; a rod mounted for movement about a pivotal axis parallel to its axis, said rod being connected for movement by said speed responsive means; a lever extending substantially parallel to said rod, said lever being movable about a pivotal axis normal to its axis; a ratio slider operatively connecting said rod and lever at a variable distance from the pivotal axis of the lever; motion amplifying means for moving said indicating means in response to movements of said lever about its pivotal axis; and means responsive to said fluid pressure for adjusting said ratio slider.

2. In a meter for indicating delivered power from a rotating shaft, a speed responsive device driven by said shaft, a torque measuring device incorporated in said shaft, a first displaceable element connected to said speed responsive device and having a displacement proportional to speed, a second displaceable element connected to said torque measuring device and having a displacement proportional to torque, an indicator graduated in power units, a multiplying device comprising a rod, a pivot whose axis is substantially parallel to the length of said rod about which said rod is movable, means for connecting one of said displaceable elements to operate said rod, a lever extending in the same general direction as said rod, a pivot for said lever, said pivot having an axis substantially perpendicular to the length of said lever, means connecting said lever to said indicator, a ratio slider operatively connecting said rod and lever, and means for connecting said ratio slider to said other displaceable element.

3. In a meter for indicating delivered power from a rotating shaft, a speed responsive device driven by said shaft, a torque measuring device incorporated in said shaft, a first displaceable element connected to said speed responsive device and having a displacement proportional to speed, a second displaceable element connected to said torque measuring device and having a displacement proportional to torque, an indicator graduated in power units, a gear train operating said indicator, a multiplying device for obtaining a movement corresponding to the product of the movements of said first and second elements, said multiplying device comprising a rod, a pivot whose axis is substantially parallel to the length of said rod and about which said rod is movable, means for connecting one of said displaceable elements to operate said rod, a lever extending in the same general direction as said rod, a pivot for said lever, said pivot having an axis substantially perpendicular to the length of said lever, means connecting said lever to said gear train, a ratio slider operatively connecting said rod and lever, means for connecting said ratio slider to the other of said displaceable elements, whereby the movement imparted by said one element to said indicator is modified by the position of said slider.

WALTER ANGST.